United States Patent [19]
Chiu

[11] Patent Number: 5,408,854
[45] Date of Patent: Apr. 25, 1995

[54] LOCKABLE WHEEL COUPLING

[76] Inventor: Te-Shih Chiu, Suite 1, 11F, 95-8 - Chang Ping Rd. Sec. 1, Taichung, Taiwan, Prov. of China

[21] Appl. No.: 931,149

[22] Filed: Aug. 18, 1992

[51] Int. Cl.⁶ .............................................. B60B 27/06
[52] U.S. Cl. ....................................... 70/225; 70/233; 70/237; 301/111
[58] Field of Search ................. 70/158, 225, 237, 258, 70/259, 260, 233, 163, 164, 166, 170, 209, 218; 301/111, 121, 126, 131

[56] References Cited

U.S. PATENT DOCUMENTS

| 457,042 | 8/1891 | Brooks et al. | 301/121 |
|---|---|---|---|
| 776,935 | 12/1904 | Pugh | 301/111 |
| 996,190 | 6/1911 | Woodbury et al. | 301/121 |
| 1,471,157 | 10/1923 | Gruber | 70/259 |
| 1,560,489 | 11/1925 | Yager | 292/37 |
| 1,883,032 | 10/1932 | Smith | 70/259 |
| 1,901,613 | 3/1933 | Smith | 70/259 |
| 1,919,492 | 7/1933 | Walters | 70/259 |
| 1,931,080 | 10/1933 | Nehls | 70/259 |
| 2,118,606 | 5/1938 | Jandus et al. | 70/259 |
| 2,291,217 | 7/1942 | Hoecker | 70/260 |

FOREIGN PATENT DOCUMENTS

| 31438 | 3/1927 | France | 70/259 |
|---|---|---|---|
| 748902 | 7/1933 | France | 70/259 |
| 500958 | 10/1930 | Germany | 70/218 |
| 235172 | 3/1945 | Switzerland | 70/225 |

Primary Examiner—Lloyd A. Gall

[57] ABSTRACT

A lockable wheel coupling comprises an axle plate having a splined shaft with a central bore, a wheel having a fluted axial bore, and a generally cylindrical locking member. The wheel can be mounted on the axle plate by engaging the shaft thereon with the axial bore of the wheel. Spring biased and radially displaceable retaining lugs within the central bore are engaged with retaining recesses on the inner periphery of the axial bore via aligned apertures in the shaft upon insertion of the locking member into the central bore, to releasably secure the wheel to the axle plate. The locking member carries a cam surface for displacing the retaining lugs outwards into corresponding retaining recesses and a set of locking bolts that snap engage into an annular locking recess in the inner periphery of the central bore to retain the locking member therein. A key operated lock cylinder within the locking member retracts the bolts when rotated so that the member can be removed from the central bore. Afterwhich, the retaining lugs retract inwardly under the action of the springs and allow the removal of the wheel from the axle plate.

7 Claims, 17 Drawing Sheets

Fig.12
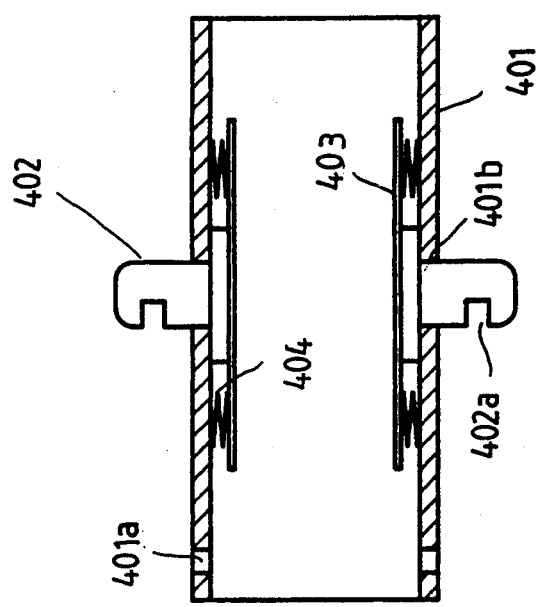
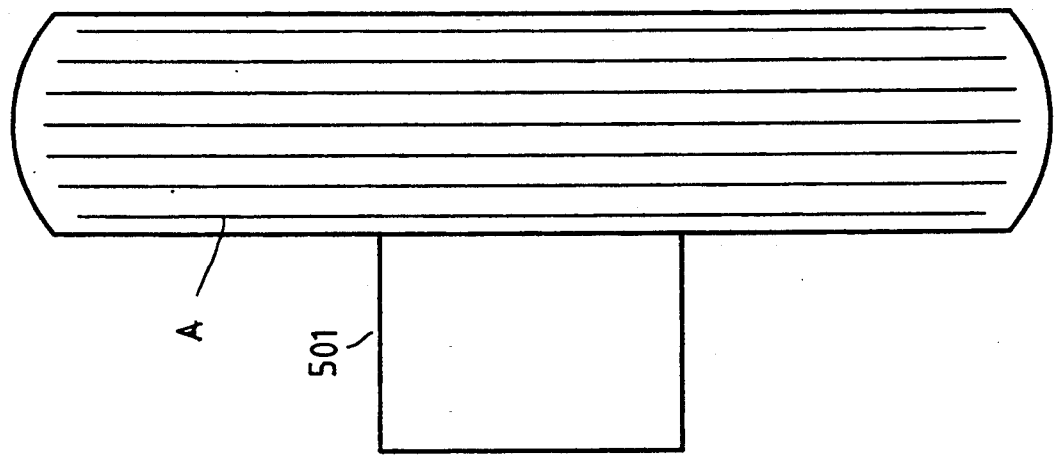
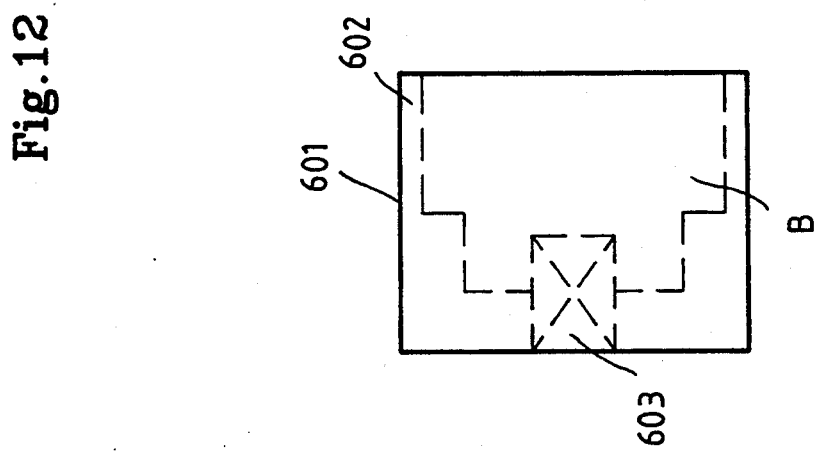

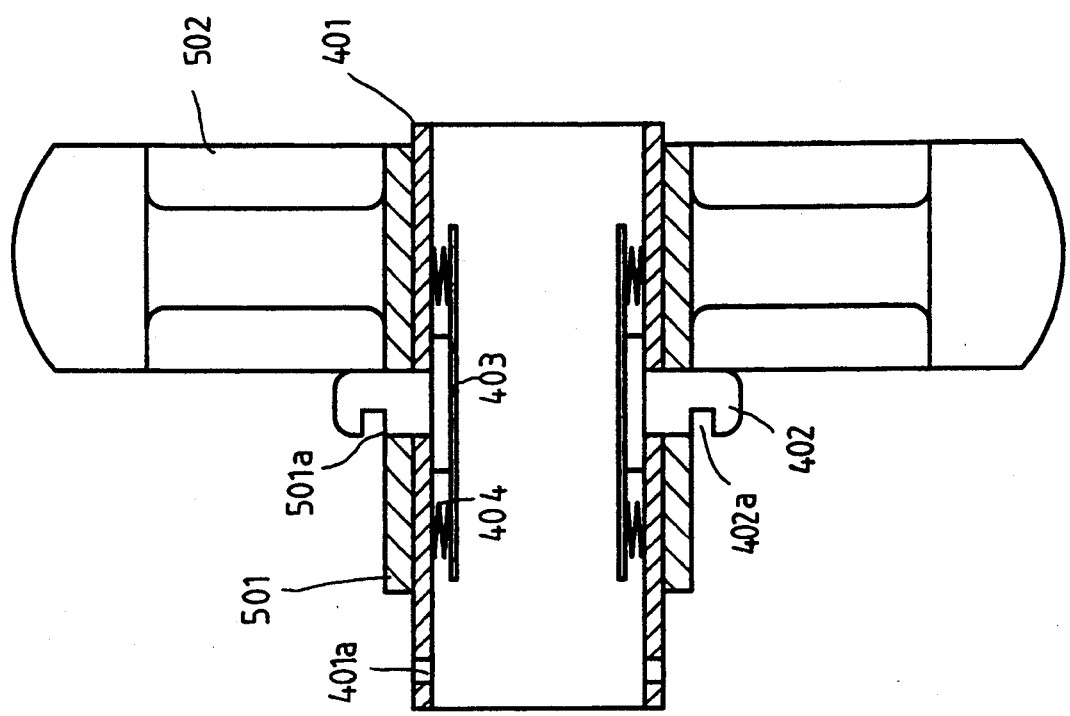
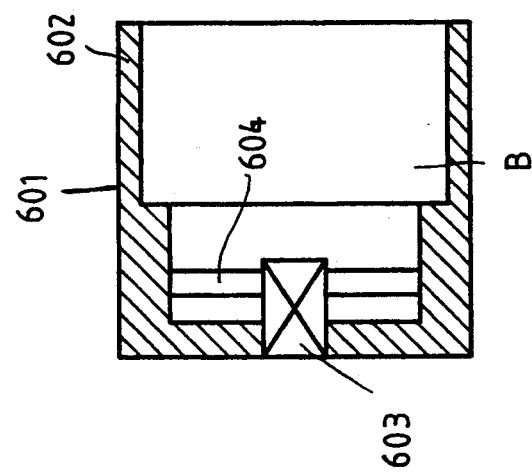
Fig.13

LOCKABLE WHEEL COUPLING

BACKGROUND OF THE PRESENT INVENTION

The present invention relates to a lockable wheel coupling, and more particularly to a lockable wheel coupling for facilitating the quick mounting or removal of a wheel assembly, as of an automobile or the like, onto an axle plate thereof and which provides means of lockable securing the wheel assembly thereon.

Conventional wheel assemblies are normally mounted on an axle plate by means of a set of bolts which are inserted through aligned paraxial holes on the wheel and axle plate with the threaded ends of the bolts extending through the outer side of the wheel where securing nuts can be engaged thereon. This conventional means of attachment though well known and effective does have a number of shortcomings. Firstly, the mounting or removal of a wheel assembly requires the individual manipulation of a number of securing nuts which is time consuming and somewhat strenuous, especially for a casual mechanic such as a car's driver. This problem is ramified by the circumstances under which a wheel assembly is usually changed, namely when a driver encounters a flat on the open road where the driver must first find a suitable hand tool, such as a socket wrench, before he or she can remove the wheel. Furthermore, it is all too common an occurrence for one or more securing nuts to become displaced or lost when changing a wheel assembly on an open road, especially in poor lighting conditions during the night. Secondly, the conventional means of securement leaves a wheel assembly vulnerable to theft as the securing nuts can also be removed by others having the proper tools.

The lockable wheel coupling of the present invention overcomes these deficiencies of the conventional form of coupling by providing a coupling that enables rapid mounting or removal of a wheel assembly, and which provides a means of locking the wheel assembly to the axle plate so that only a user in possession of a proper key can remove the coupling.

SUMMARY OF THE PRESENT INVENTION

A lockable wheel coupling in accordance with the present invention comprises a wheel having an axial bore and an axle plate from which a shaft protrudes. The outer periphery of the shaft is provided with one or more radial projections, such as splines, for engaging cooperating coupling recesses on the inner periphery of the axial bore when the wheel is mounted thereon. The shaft is further provided with one or more spring biased locking lugs movably positioned within a central bore. Radial apertures formed through the central bore are brought into registry with retaining recesses in the bore of the wheel when the shaft is inserted therein. Each locking lug can then engage a corresponding locking recess through an aperture to releasably secure the wheel to the axle plate. This is effected by inserting a locking member into the central bore of the shaft so as to cause a cam surface thereon to engage a cooperating cam surface on each locking lug, causing the lugs to move radially outward into their corresponding retaining recesses. The locking member is in turn secured within the central bore by one or more radially extendible bolts when a key operated cylinder lock therein is rotated so as to cause the locking bolts to engage a locking recess within the central bore.

It is thus an object of the present invention to provide a lockable wheel coupling as characterized which can facilitate the rapid removal or mounting of a wheel assembly, such as of an automobile or the like, onto an axle plate thereof.

A further object of the present invention is to provide a wheel coupling as characterized which can prevent the theft or unauthorized removal of a wheel assembly from an axle plate lockedly secured therewith.

More particular objects and advantages of the present invention will become readily apparent by reference to a detailed description of a preferred embodiment thereof provided below along with accompanying drawings.

BRIEF DESCRIPTION OF THE DRAWINGS

FIG. 12 is a partly sectional view of a fourth embodiment of the lockable wheel coupling with the axle member, wheel assembly, and locking member thereof separated.

FIG. 13 is a sectional view of the fourth embodiment with the wheel assembly mounted on the axle member.

DETAILED DESCRIPTION OF THE PREFERRED EMBODIMENTS

Figure 1:
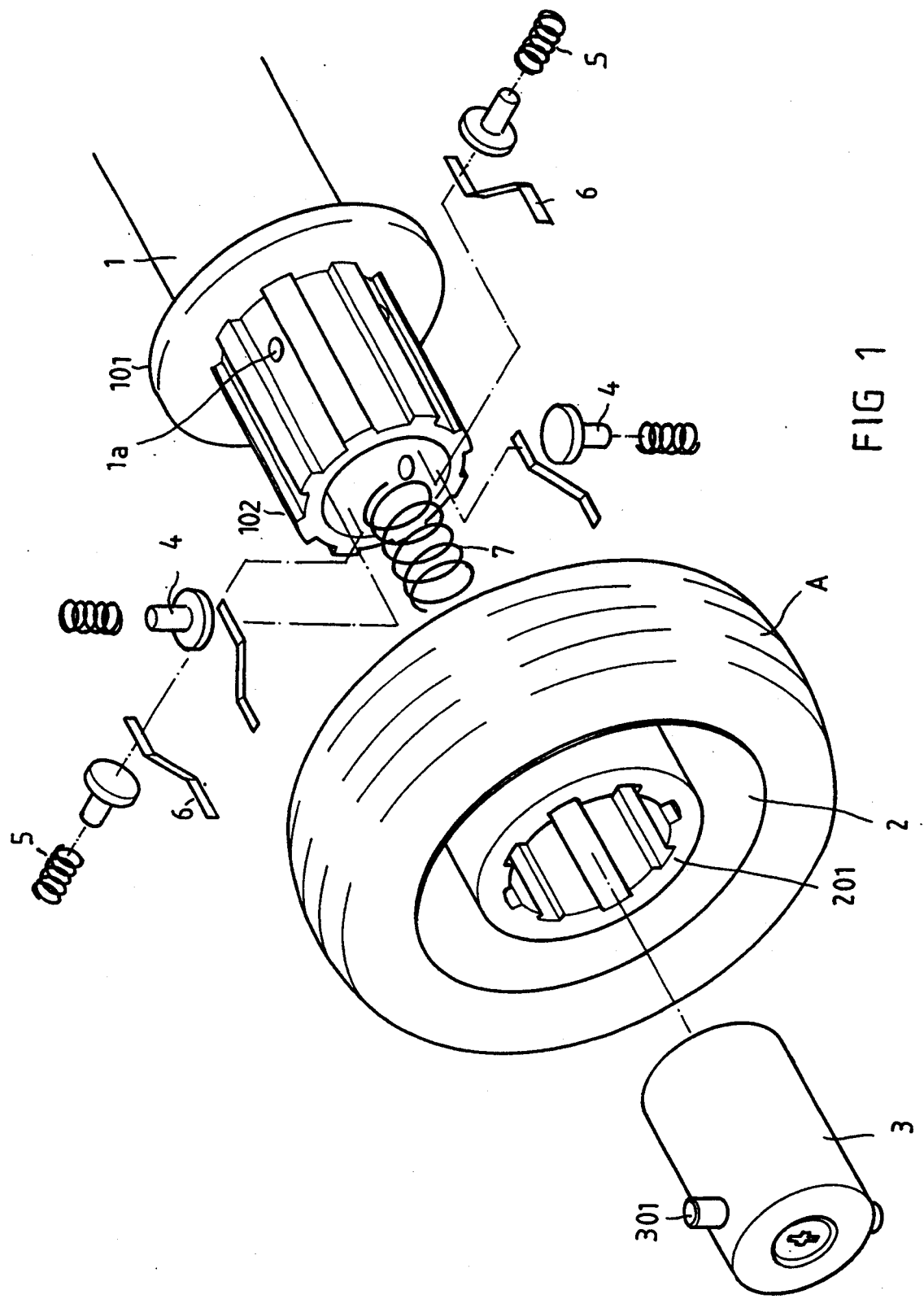
FIG. 1 is a perspective exploded view of a first embodiment of the lockable wheel coupling of the present invention.
Figure 2:
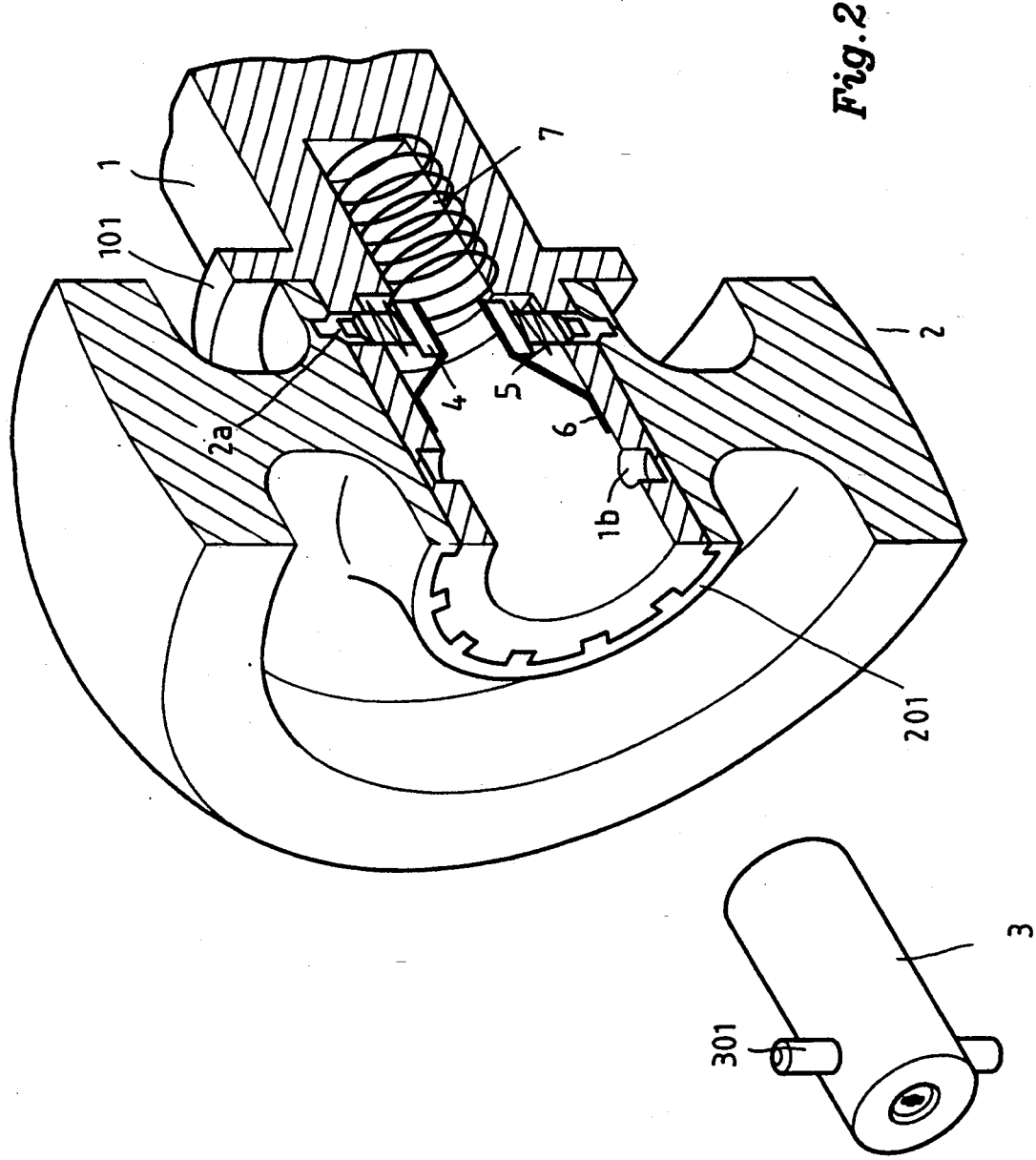
FIG. 2 is a perspective view of the lockable wheel coupling when assembled.
Figure 3:
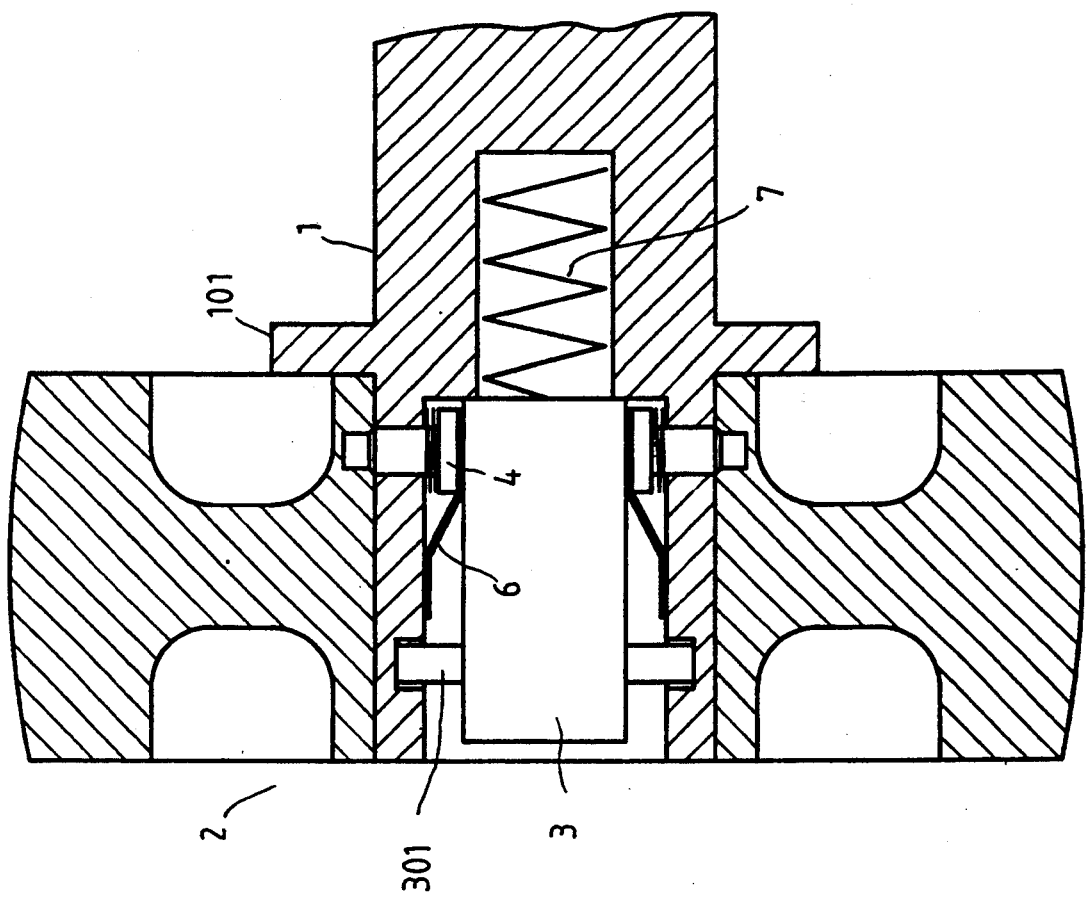
FIG. 3 is a sectional view of the assembly.

Referring to FIGS. 1 to 3 of the drawings, a first embodiment of the lockable wheel coupling of the present invention comprises an axle assembly 1 including a medial flange 101 and forward shaft 102, a wheel 2 having a fluted bore 201 and a tire A mounted thereon, and a locking member 3 for releasably securing the wheel to the axle assembly.

The wheel can be slidingly mounted on the axle assembly with the fluted bore 201 thereon engaging the cooperative splined outer periphery of shaft 102. A set of four equally spaced radial retaining recesses 2a are formed around the inner periphery of bore 201 towards the rear thereof. Recesses 2a are in registry with corresponding apertures 1a formed radially through shaft 102 when the mounted wheel 2 is in abutment with flange 101. A respective radially oriented locking pin 4 is slidingly retained in each aperture 1a by an axially aligned leaf spring having a ramped medial section and parallel end sections. Each locking pin 4 is biased radially inwards by a coil spring 5 disposed thereon between an enlarged head of the pin and the inner periphery of the shaft. With the wheel mounted on the axle assembly, the cylindrical locking member 3 can be inserted into the central bore of shaft 102 so as to effect the outward radial displacement of locking pins 4, wherein the inner peripheral end of the member 3 engages the medial sections of the springs 6 which act as cam surfaces and effects their flexure. A rear end section of the springs 6 acts against the enlarged heads of the pins to cause the tapered ends thereon to enter the conformingly shaped recesses 2a in the bore 201 and prevent the removal of the wheel from the axle assembly.

The locking member 3 carries a key operated lock cylinder which actuates a pair of radial locking bolts 301. The locking bolts 301 are displaced outwardly into corresponding locking recesses 1b formed in a front portion of the inner periphery of shaft 102 to secure the locking member therein. A coil spring 7 disposed in a rear cavity within axle assembly 1 is compressed by the inward travel of the locking member and facilitates the retrieval of the member when the bolts 301 are retracted from their respective recesses by urging the member outwards therefrom.

Figure 4:
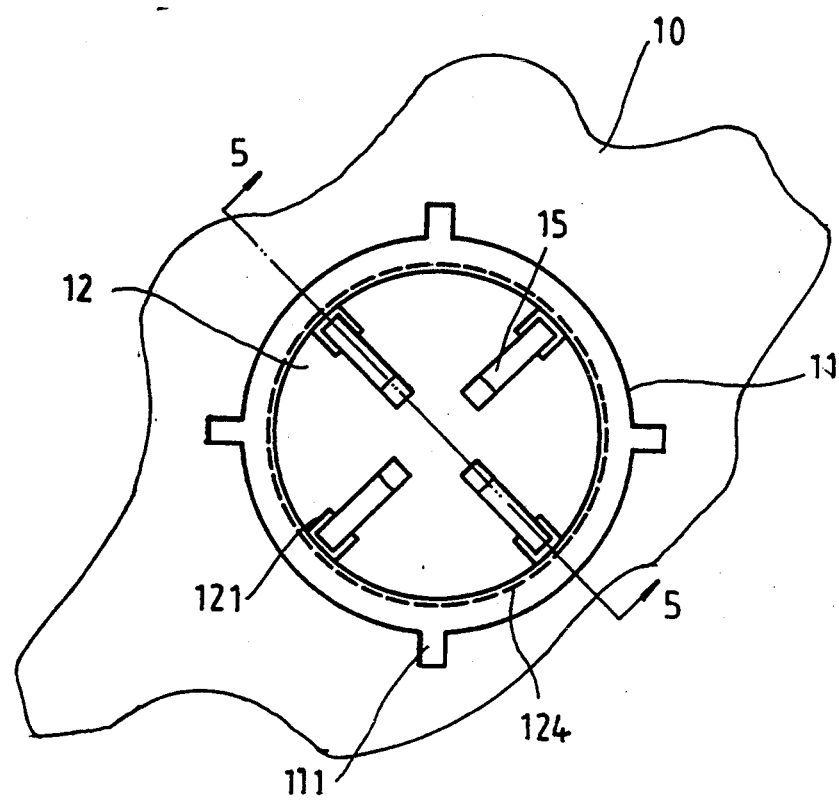
FIG. 4 is frontal view of an axle plate of a second embodiment of the lockable wheel coupling detailing a protruding shaft thereon.
Figure 5:
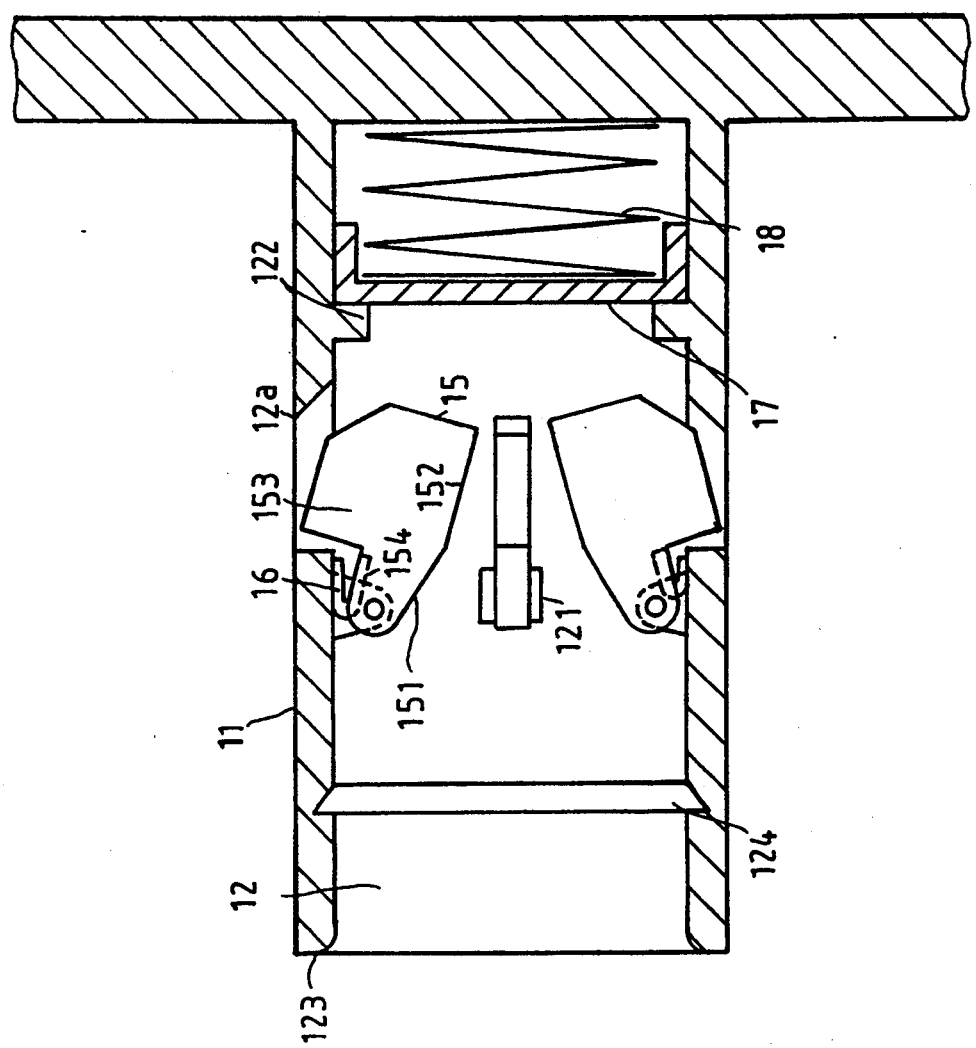
FIG. 5 is a sectional view taken along line 5—5 of FIG. 4, showing locking lugs pivotably positioned within a central bore of the protruding shaft.
Figure 6:
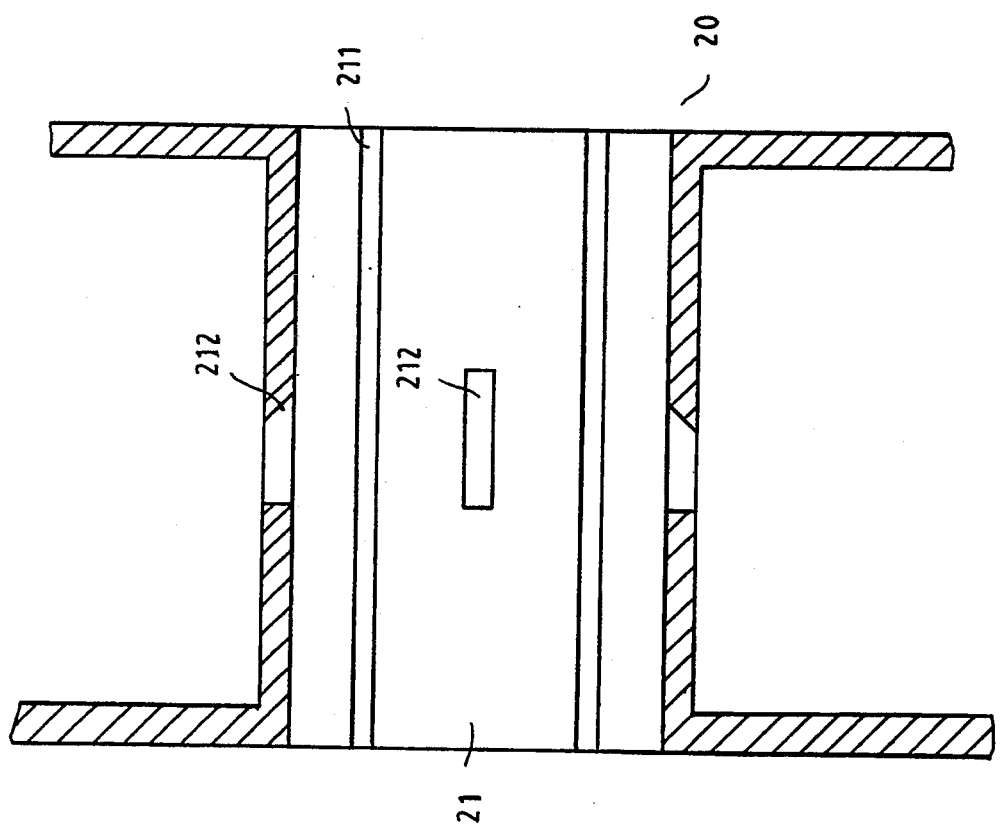
FIG. 6 is sectional view of an axial bore of a wheel to be coupled to the axle plate.

Referring to FIGS. 4 to 6 of the drawings, a second embodiment of the lockable wheel coupling comprises an axle plate 10 having a shaft 11 protruding from one side thereof and a wheel 20 having an axial bore 21. Four axially aligned, radial splines 111 are provided around the outer periphery of shaft 11. Accordingly, bore 21 is provided with four cooperating axially aligned, radial recesses 211 for engagement with splines 111 so as to rotatingly couple wheel 20 to axle plate 10 when mounted thereon. A central bore 12 formed within shaft 11 carries a set of four locking lugs 15 that are pivotably secured to respective clevis projections 121 extending radially inwards from the inner periphery of the bore, as shown in FIG. 5. Each lug 15 has an inclinate cam surface 151 defined thereon that extends radially inwards and towards the rear of bore 12, adjoining therewith is an inflected, abutment surface 152 that angles more gradually towards the axis of the bore. A protruding engagement portion 153 on each locking lug, opposite from the abutment surface 152 thereon, is intromittable through a corresponding radial aperture 12a formed through the periphery of the bore. A leaf spring 16 that resists outward radial displacements of a corresponding locking lug 15 normally positions the lug so that the engagement portion 153 thereon is within the outer periphery of shaft 11. The generally V shaped springs have one arm in abutment with the inner periphery of bore 12 and the other disposed within a groove 154 on a corresponding locking lug, formed between the pivot point and the engagement portion thereof.

Figure 7:
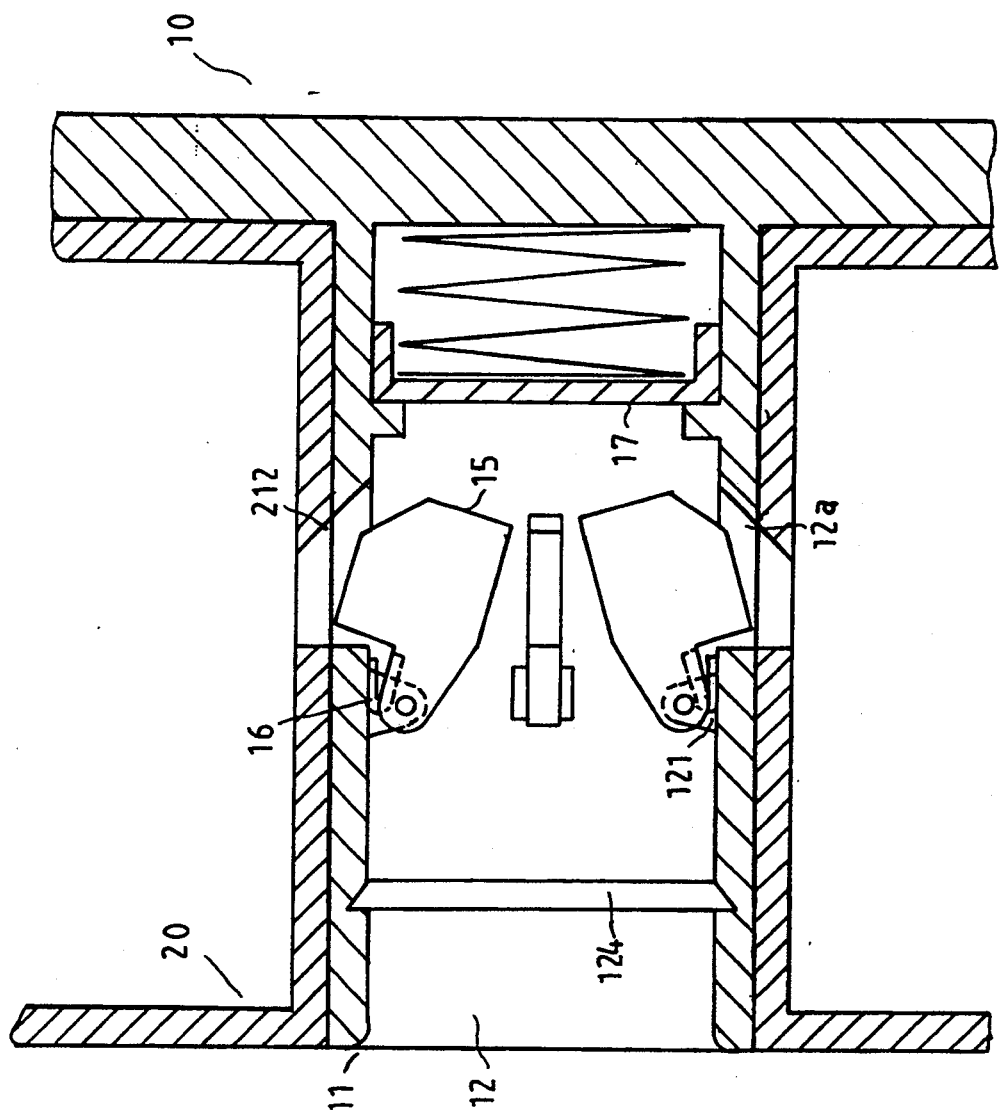
FIG. 7 is a sectional view showing the wheel mounted on the axle plate with the shaft of the axle plate being inserted into the bore of the wheel.

As shown in FIG. 7, wheel 20 can be mounted on axle plate 10 by positioning the wheel thereagainst so as to insert shaft 11 into bore 21, with splines 111 engaging corresponding coupling recesses 211 therein. Concomitantly, a set of four retaining recesses 212 formed in bore 21 at a medial position therein between the coupling recesses are brought into registry with apertures 12a on the protruding shaft of the axle plate. The retaining recesses conform in shape with the engagement portions 153 of the locking lugs which can be received therein to releasably secure the wheel to the axle plate, as detailed below.

Figure 8:
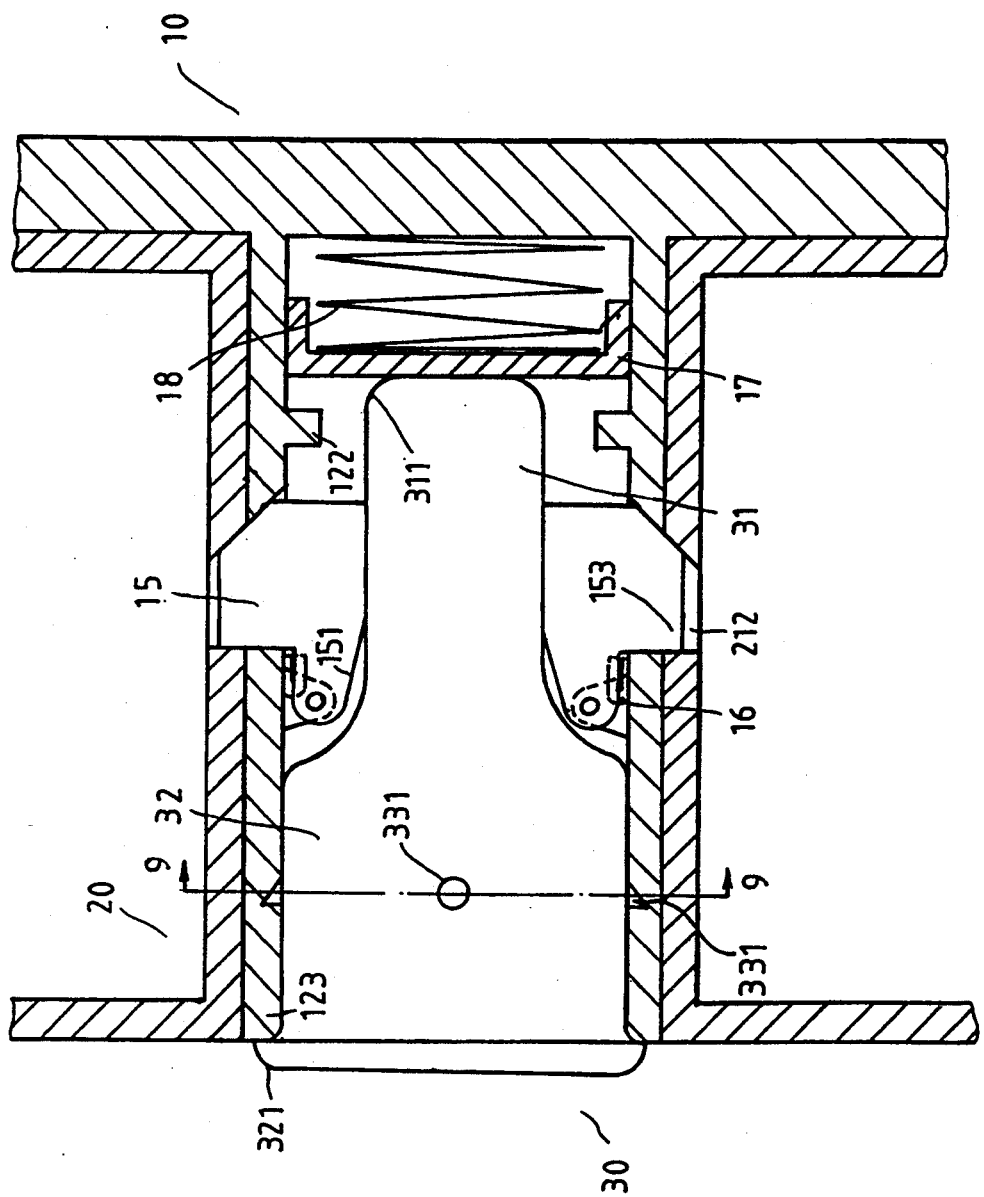
FIG. 8 is a sectional view as in FIG. 7 with a locking member inserted into the bore of the wheel so as to engage the locking lugs with retaining recesses in the bore of the wheel.

Referring to FIG. 8, an elongate, stepped diameter locking member 30 having a reduced diameter inner plunger 31 and an enlarged diameter outer portion 32 of substantially the same diameter as that of bore 12 is inserted therein to effect the securement of the wheel and axle plate. Wherein, a cam surface defined by a rounded, peripheral rim 311 on the terminal end of plunger 31 engages the inclined cam surfaces 151 of the locking lugs. The rearward travel of the locking member causes the locking lugs to pivot radially outwards against the bias of the compressed springs 18. Each locking lug reaches its maximum outward displacement when the engagement portions 153 thereon are positioned within corresponding retaining recesses 212 in the bore of wheel 20. Plunger 31 continues it's rearward travel past the cam surfaces on the locking lugs so that the now paraxial abutment surfaces thereon are in contact with the periphery of the plunger. The flat terminal end of the plunger subsequently engages a cup shaped piston 17 disposed to the rear of an annular stop 122 in the central bore and compresses a coil spring 18 therebehind. The rearward travel of the locking member 30 is arrested when a flanged outer end portion 321 thereof is in abutment with the outer rim 123 of bore 12.

A set of four spring loaded locking bolts 331 that are extendable through the periphery of outer portion 32 concomitantly engage an annular locking groove 124 formed at a predetermined position around the inner periphery of bore 12 to secure the locking member therein. The beveled ends of the bolts are cammed inwards when contact is made with the rounded outer rim 123 of the central bore during the insertion of the locking member, and snap outwards into the cooperating, roughly V sectioned groove when in registry therewith. The locking groove and beveled ends of bolts 331 have abutting surfaces which are substantially perpendicular with the axis of bore 12 so as to prevent the outward displacement of the locking member therefrom. The positioning of the locking member within the bore of the shaft thus effectively maintains the engagement of locking lugs 15 with the retaining recesses in wheel 20 to prevent the separation of the wheel from the axle plate.

Figure 9:
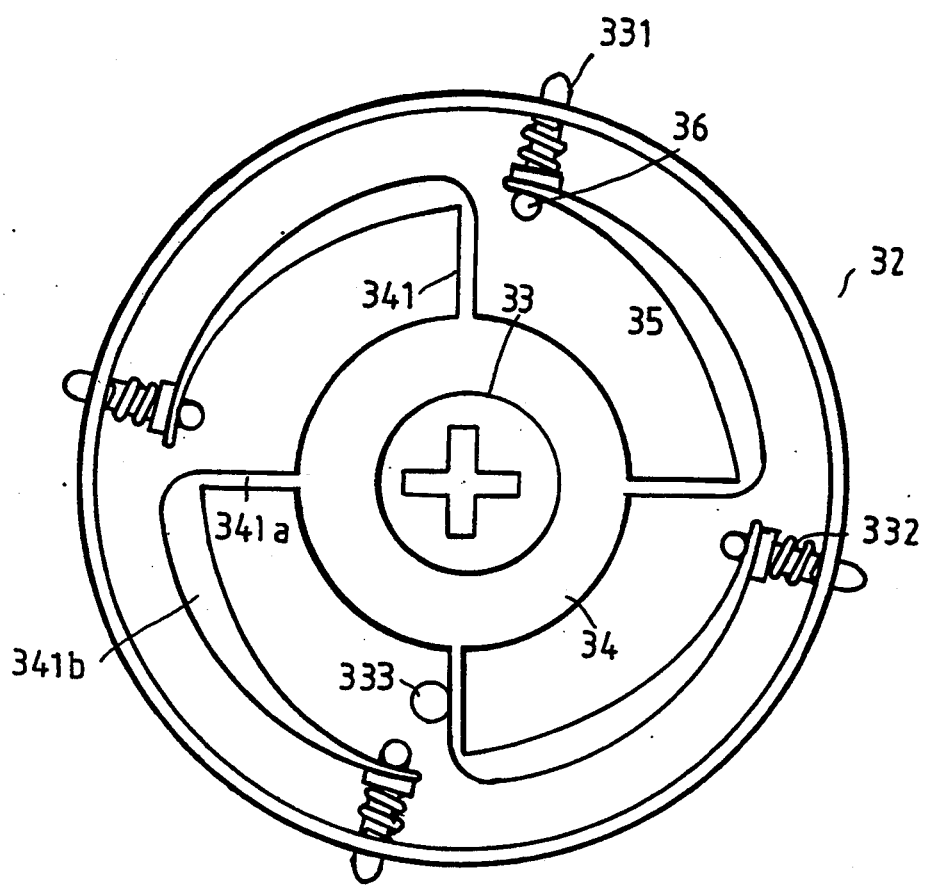
FIG. 9 is a sectional view of the locking member showing a bolt operating mechanism therein.

As shown in FIG. 9, the outer portion 32 of the locking member is provided with a key operated lock cylinder 33 that is rotatingly coupled to a cam plate 34. The concentric cam plate includes four equally spaced arms 341 having a radially extending portion 341a and an adjoining arcuate cam portion 341b. Each cam portion has an arcuate cam surface 38 of predetermined shape defined on the inner side thereof which is in engagement with a cam follower 36 on the inner end of a corresponding locking bolt 331. Each cam follower 36 which projects perpendicularly from the end of a corresponding bolt 331 is adjacent the terminal end of a corresponding cam surface 35 when the cam plate is in an open position, as depicted in the figure, wherein the locking bolts are free to retract within the periphery of outer portion 32 against the bias of springs 332 upon engagement with the outer rim of bore 12. The lock cylinder 33 can be operated by inserting an appropriate key therein. By rotating the lock cylinder in a counterclockwise direction the cam surfaces 35 on the commensurately rotating cam plate causes the locking bolts 331 to retract within the periphery of outer portion 32 so that the locking member can be extracted from the central bore 12, with spring 18 acting against piston 17 to aid it's expulsion therefrom. A fixed stop 333 in the interior of the outer portion of the locking member prevents the rotation of the cam plate in a clockwise direction. The locking lugs 15 pivot inwards after the plunger 31 is retracted from therebetween so that the engagement portions 153 of the lugs are disengaged from the retaining recesses 212, allowing the removal of wheel 20 from the axle plate 10.

Figure 10:
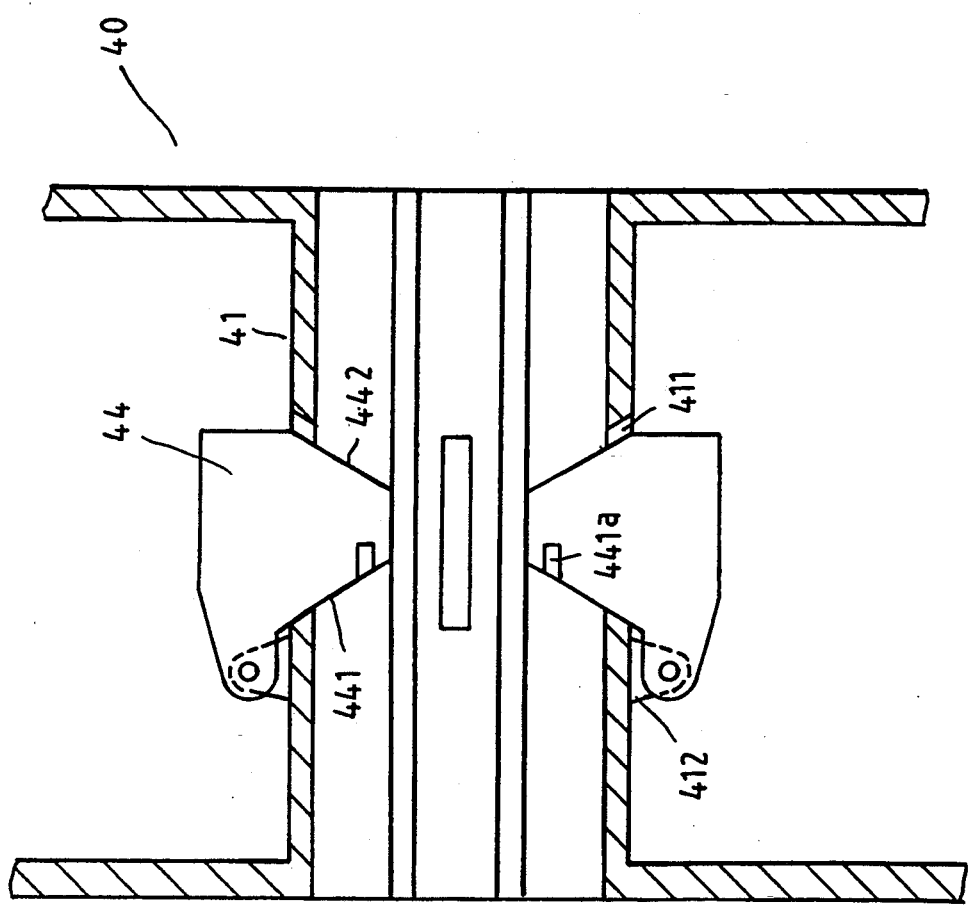
FIG. 10 is a sectional view of the wheel of a third embodiment of the lockable wheel coupling.
Figure 11:
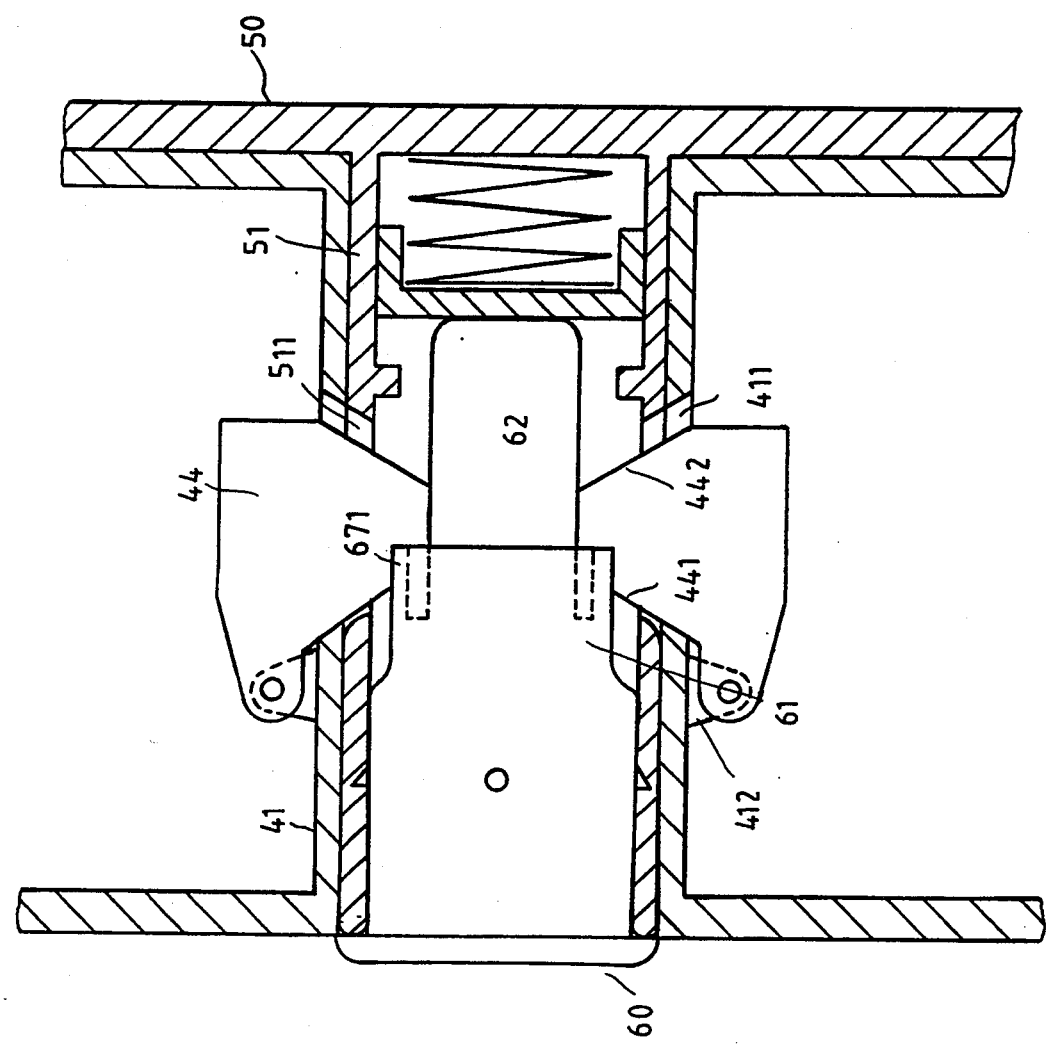
FIG. 11 is a sectional view of the assembled wheel, axle plate, and locking member of the third embodiment.

A third embodiment of the lockable wheel coupling is shown in FIGS. 10 and 11, wherein a set of locking lugs 44 are instead pivotably secured to the outer periphery of a bore cylinder 41 of a wheel 40 and project radially inwards through corresponding apertures 511 of a shaft 51 to secure the wheel to an axle plate 50. The lugs 44 are disposed around the outer periphery of the cylinder 41 adjacent slot like apertures 411 formed thereon being pivotably secured to corresponding clevis projections 412 adjacent the forward ends of the apertures, and are spring biased to rotate radially inwards therethrough. The engagement portion of each lug 44 which projects into the shaft 51 has a generally trapezoidal section so as to define two inclined cam surfaces 441,442 at the front and rear respectively.

The rear cam surface 442, engages the rounded front rim of shaft 51 when the wheel 40 is slid thereover so as to effect the outward radial displacement of the lugs 44. Upon contact of the wheel with axle plate 50 the locking lugs 44 therein once again project inwards through apertures 411 and through cooperating apertures 511 in registry therewith, as in FIG. 11.

The locking member 60 of this embodiment is provided with a hollow cylindrical rear section 61 of lesser diameter than the front section which remains largely unchanged. The rear section 61 has a concentric rod 62 which protrudes rearwards from the terminal rim 671 of the rear section and defines an annular cavity therebetween. The protruding rim 671 of the rear section engages a receiving groove 441a formed on front cam surface 441 when the locking member is inserted into the wheel and plate assembly to prevent the outward displacement of the locking lugs. The rod 62 acts to compress a rear spring as in the previous embodiment to facilitate removal of locking member 60 which has a similar locking mechanism with that of the former.

The wheel 40 is thus likewise removed from axle plate 50 by first retracting locking member 60 wherein the rounded front terminations of apertures 511 engage the front cam surfaces 441 of corresponding locking lugs to effect their outward displacement.

Figure 14:
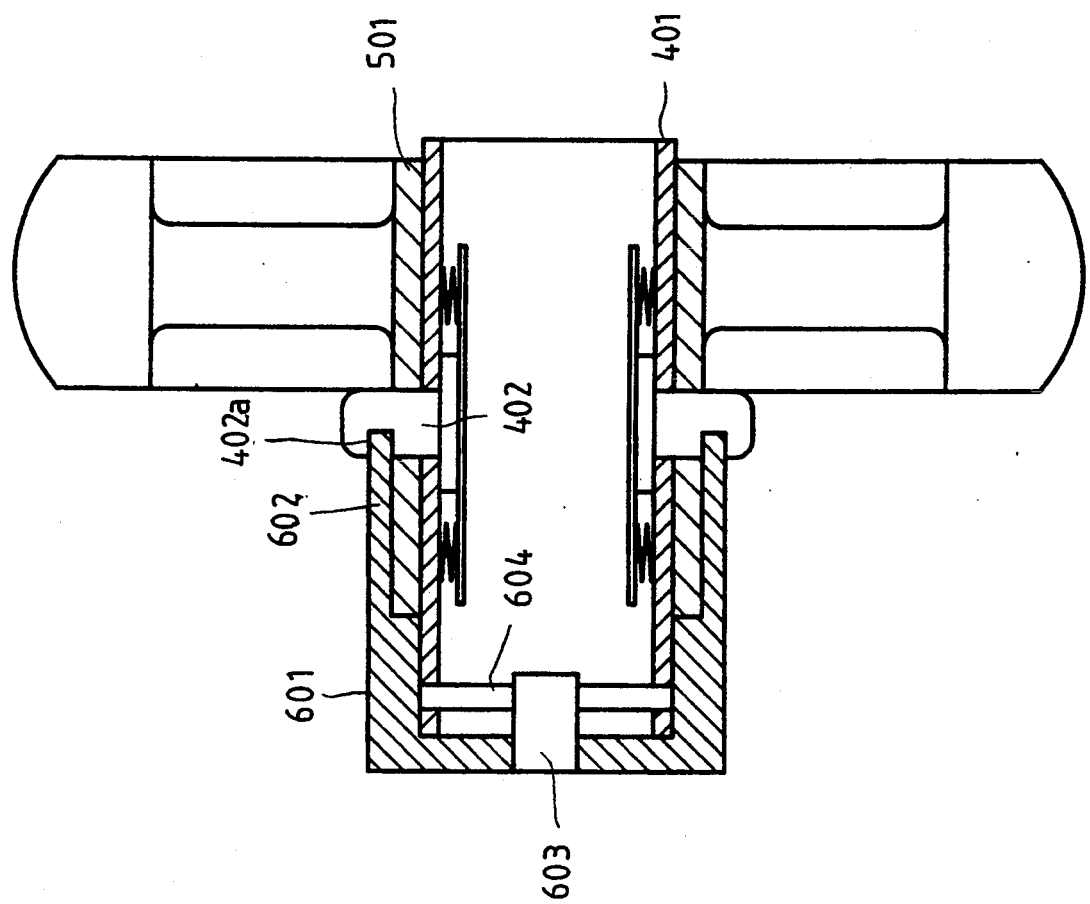
FIG. 14 is a sectional view as in FIG. 13 with the locking member secured onto the assembly.

FIGS. 12 to 14 show a fourth embodiment of the lockable wheel coupling comprising an axle sleeve 401 carrying a set of spring biased locking lugs 402, a wheel assembly including a bore cylinder 501 and flange 502 with a tire A thereon, and a cup like locking member 601. A set of radial locking apertures 401a are formed around axle sleeve 401 near the front rim thereof for engagement with the locking member. Similarly, a set of radial retaining apertures 401b corresponding with the locking lugs are formed at predetermined medial positions along the axle sleeve. Each locking lug 402 has a broadened inner base 403 disposed within the axle sleeve and a salient outer engagement portion with a groove 402a formed thereon which is aligned substantially parallel with the axis of sleeve 401. A pair of springs 404 disposed between the base 403 of each locking lug and the inner periphery of the axle sleeve biases the lugs 402 in an outward radial direction so that the engagement portions thereon normally project through corresponding apertures 401b on the sleeve. A front section of bore cylinder 501 projects from the front or outer side of the wheel assembly and has a set of cooperating apertures 501a formed thereon adjacent flange 502 for receiving the locking lugs. Locking member 601 has a stepped diameter cavity B formed through the rear thereof with the lesser diameter inner section of the cavity being in communication with a lock cylinder 603 secured to the front of the locking member. Radial locking bolts 604 thereon are extendable to the inner periphery of the lesser diameter section of cavity B.

The wheel assembly is mounted on the axle sleeve 401 by first depressing the lugs 402 into the outer periphery thereon and sliding the bore cylinder 501 thereover so as to align apertures 501a with apertures 401b. Afterwhich, the locking lugs re-extend through the aligned apertures 501a and 401b to rotatingly couple the axle sleeve with the wheel assembly. The locking member 601 is then inserted over the front of the bore cylinder and a protruding exposed section of sleeve 401 so as to engage a retaining rim 602 on the rear thereof with the grooves 402a, which are flush with the outer periphery of the bore cylinder, and prevent the retraction of the lugs. The locking member is secured to the wheel and axle assembly by engaging the locking bolts 604 with corresponding apertures 401a via operation of the lock cylinder 603.

Figure 15:
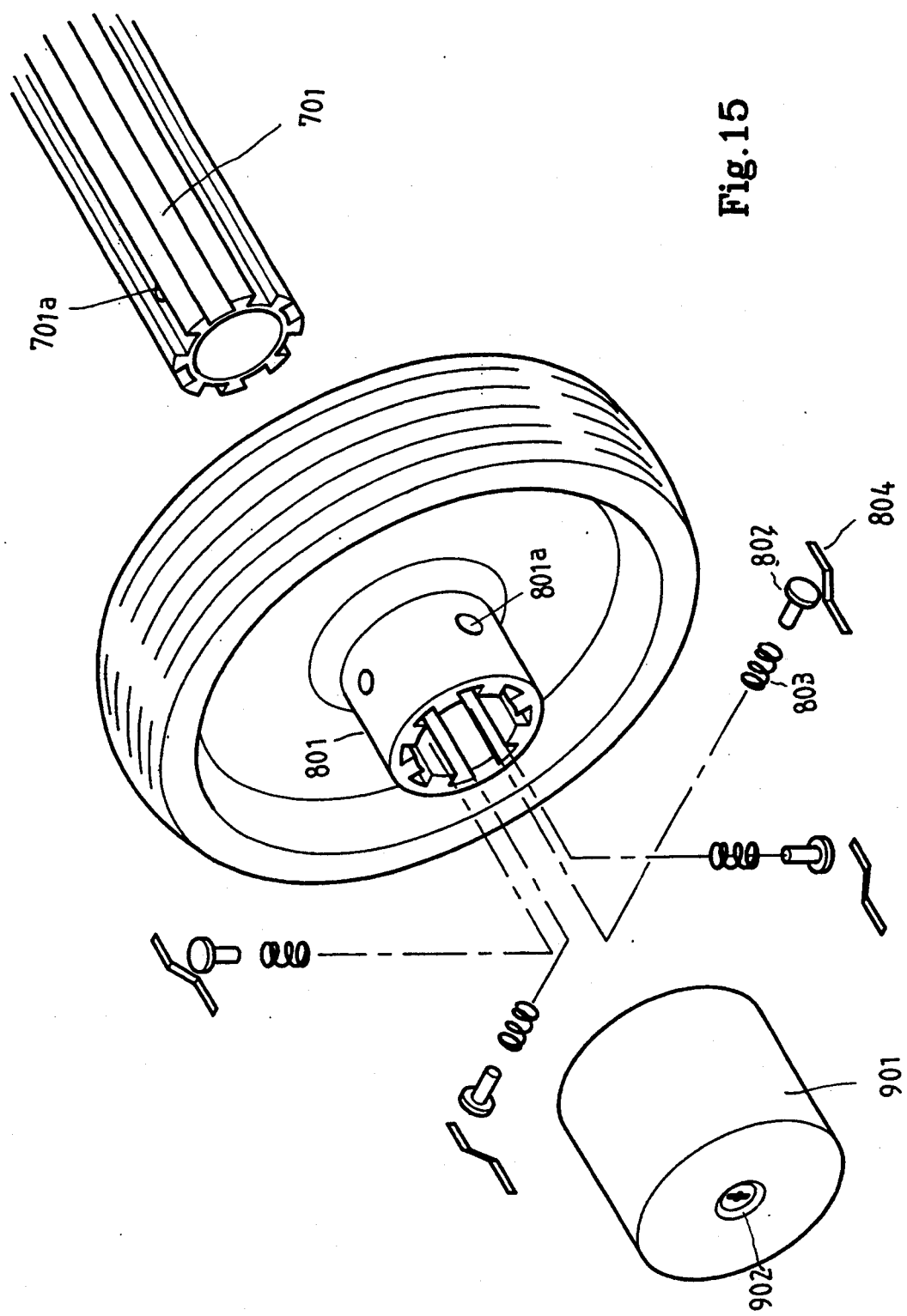
FIG. 15 is a perspective view of a fifth embodiment of the lockable wheel coupling.
Figure 16:
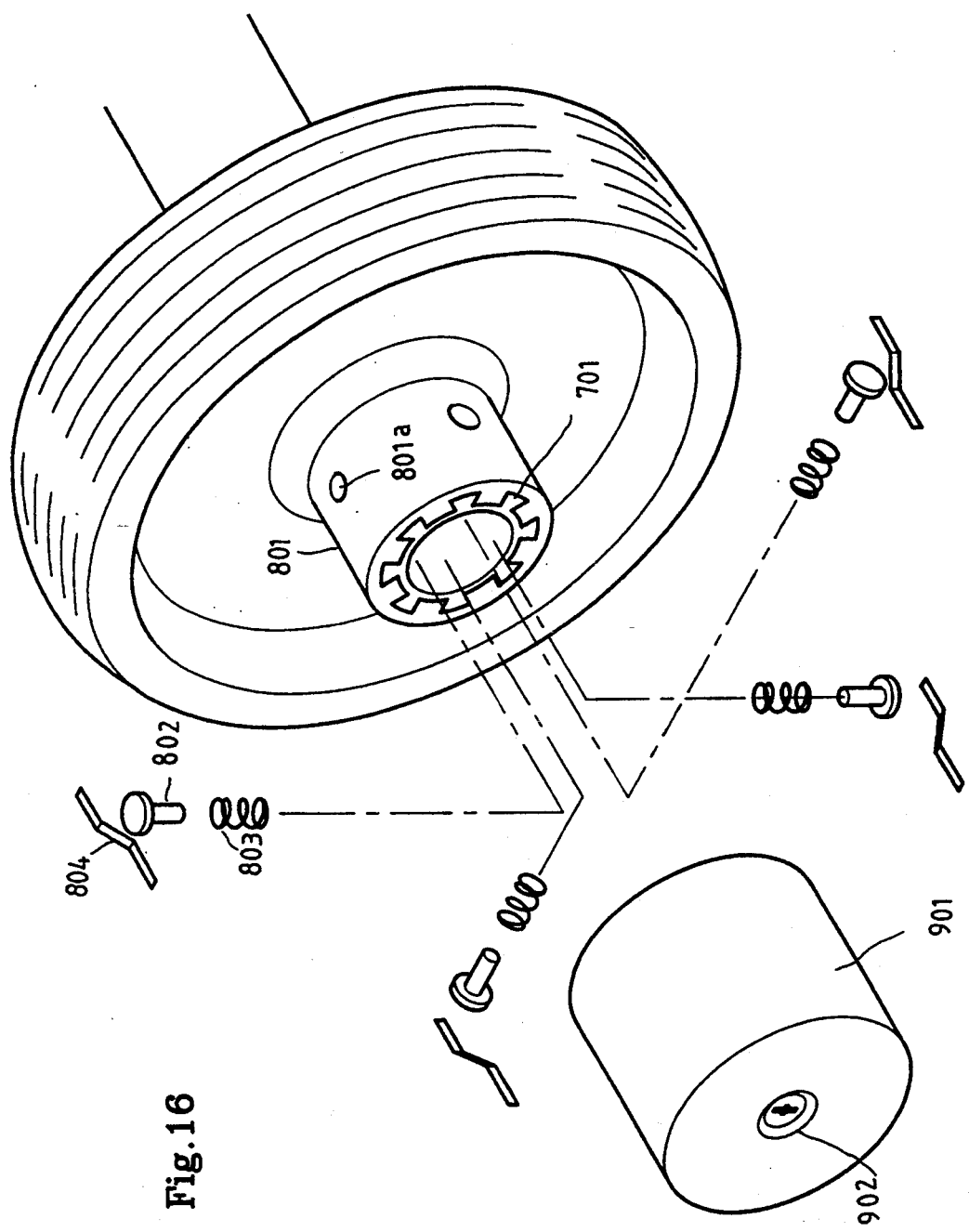
FIG. 16 is a perspective view of the embodiment of FIG. 15 with the wheel assembly thereof mounted on an axle member.
Figure 17:
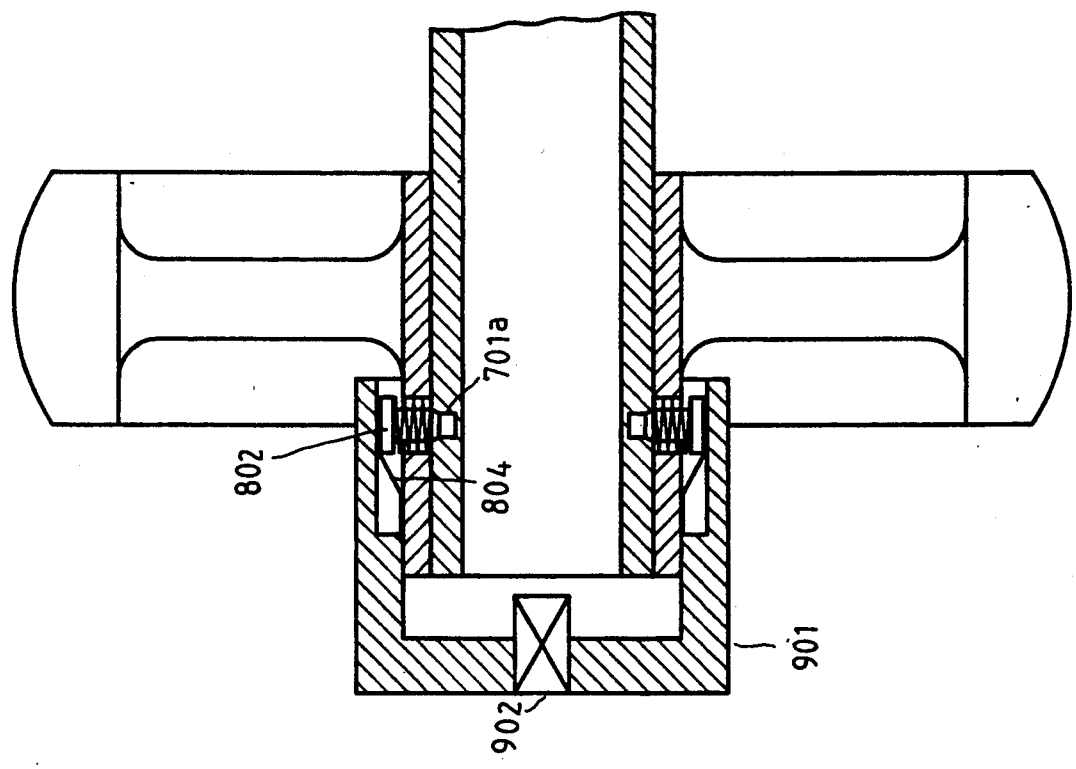
FIG. 17 is a sectional view of the embodiment of FIG. 15 with the locking member thereof in place.

A fifth embodiment as shown in FIGS. 15 to 17 includes an axle sleeve 701 having a splined outer periphery, a wheel assembly with a flanged bore cylinder 801 that has a fluted inner periphery adapted to receive the axle sleeve, and a roughly cup shaped locking member 901 also having a stepped diameter cavity therein.

The protruding portion of bore cylinder 801 has a set of radial retaining apertures 801a formed thereon. A locking pin 802 and compression spring 803, that are similar with the corresponding elements of the first embodiment, are disposed in each aperture 801a. Likewise a leaf spring 804 having a ramped medial section, is positioned adjacent and over the head of each locking pin 802. A set of radial, tapered recesses 701a are formed around the outer periphery of sleeve 701 near the front end thereof for engagement with the locking pins.

The recesses 701a are in registry with apertures 801a when the wheel assembly is inserted over the axle sleeve so as to bring the front face thereon flush with that of the bore cylinder. When the locking member 901 is inserted over the bore cylinder, the lesser diameter section of the cavity therein contacts the outer periphery of the bore cylinder while the larger diameter section defines a space therebetween and engages the ramped sections of the springs 804 to effect the inward displacement of pins 802 into their corresponding recesses 701a on the axle sleeve. Securement of the locking member and wheel assembly is effected by operation of a lock cylinder 902 as in all embodiments.

Note that the specificities relating to the above embodiment should be construed as to be exemplary rather than as limitative of the present invention, with many variations and modifications being readily attainable by a person of average skill in the art without departing from the spirit or scope thereof as defined by the appended claims and their legal equivalents.

I claim:

1. A lockable wheel coupling comprising a wheel having an axial bore, an axle plate having a protruding shaft and a locking member, wherein:

said protruding shaft has at least one radial projection on an outer periphery thereof, and a central bore, said shaft having at least one radial aperture formed therethrough and at least one locking recess on an inner periphery thereof;

at least one retaining lug having a first cam surface is movably positioned within said central bore, with each said retaining lug being intromittable through a corresponding said aperture;

at least one spring element is positioned within said central bore for biasing each said retaining lug away from a corresponding said aperture, each said at least one spring element defining a ramped section with one end thereof in abutment with a corresponding said first cam surface;

said axial bore has at least one axially aligned coupling recess, and at least one radial retaining recess formed at a predetermined position in the inner periphery thereof, said wheel being positionable on said protruding shaft with said protruding shaft inserting into said axial bore, wherein each said projection engages a said coupling recess to rotatingly couple said wheel to said axle plate, and each said aperture is in registry with a corresponding said retaining recess;

said locking member carries a key operated rotatable lock cylinder, at least one locking bolt being extendable through an outer periphery thereon, means for radially displacing each said locking bolt by the rotation of said lock cylinder, and at least one second cam surface, said locking member being intromittable into said central bore, wherein said second cam surface engages said ramped section of each said at least one spring element to effect an outward radial displacement of corresponding said at least one retaining lug through associated said aperture and into engagement with an aligned said retaining recess to releasably secure said wheel to said axle plate, and each said locking bolt is engageable with a said locking recess by a radial displacement thereof to prevent the removal of said locking member from said central bore.

2. A lockable wheel coupling according to claim 1, wherein each said retaining lug is pivotably secured in said central bore.

3. A lockable wheel coupling according to claim 2, wherein each said second cam surface comprises a rounded, peripheral rim on said locking member.

4. A lockable wheel coupling according to claim 3, further comprising a resilient means for facilitating the removal of said locking member from said central bore by urging said locking member outwards therefrom.

5. A locking wheel coupling according to claim 4, wherein said at least one locking recess has a generally annular form extending around an inner periphery of said central bore, and each said locking bolt is resiliently supported so as to displace radially inward upon the intromission of said locking member into said central bore and displace radially outward into said at least one locking recess when in registry therewith.

6. A locking wheel coupling according to claim 1, wherein each said retaining lug is slidingly secured in a substantially radial direction in said central bore.

7. A lockable wheel coupling according to claim 6, further including means for translating an inward motion of said locking member within said central bore into an outward radial displacement of each said retaining lug.

* * * * *